US010353820B2

(12) United States Patent
Wallace et al.

(10) Patent No.: US 10,353,820 B2
(45) Date of Patent: *Jul. 16, 2019

(54) LOW-OVERHEAD INDEX FOR A FLASH CACHE

(71) Applicant: EMC IP Holding Company LLC, Hopkinton, MA (US)

(72) Inventors: Grant R. Wallace, Pennington, NJ (US); Philip N. Shilane, Newtown, PA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/103,499

(22) Filed: Aug. 14, 2018

(65) Prior Publication Data

US 2019/0004957 A1  Jan. 3, 2019

Related U.S. Application Data

(63) Continuation of application No. 15/196,163, filed on Jun. 29, 2016, now Pat. No. 10,055,351.

(51) Int. Cl.
*G06F 12/14* (2006.01)
*G06F 12/0864* (2016.01)
(Continued)

(52) U.S. Cl.
CPC ...... *G06F 12/0864* (2013.01); *G06F 12/0877* (2013.01); *G06F 12/0891* (2013.01);
(Continued)

(58) Field of Classification Search
CPC ............ G06F 3/00; G06F 3/06–3/0689; G06F 12/00; G06F 12/08; G06F 12/0802–12/0864; G06F 12/0866–12/0877; G06F 12/0879–12/0888;
(Continued)

(56) References Cited

U.S. PATENT DOCUMENTS 4,513,367 A  4/1985 Chan
4,785,395 A  11/1988 Keeley
(Continued)

OTHER PUBLICATIONS

B-tree indexes and CPU caches; Graefe et al.; Proceedings 17th International Conference on Data Engineering; Apr. 2-6, 2001 (Year: 2001).*

(Continued)

*Primary Examiner* — Daniel C. Chappell
(74) *Attorney, Agent, or Firm* — Workman Nydegger

(57) ABSTRACT

Systems and methods for a low-overhead index for a cache. The index is used to access content or segments in the cache by storing at least an identifier and a location. The index is accessed using the identifier. The identifier may be shortened or be a short identifier. Because a collision may occur, the index may also include one or more meta-data values associated with the data segment. Collisions can be resolved by also comparing the metadata of the segment with the metadata stored in the index. If both the short identifier and metadata match those of the segment, the segment is likely in the cache and can be accessed. Segments can also be inserted into the cache.

20 Claims, 4 Drawing Sheets

(51) Int. Cl.
  *G06F 12/0877* (2016.01)
  *G06F 12/0891* (2016.01)
  *G06F 12/0893* (2016.01)

(52) U.S. Cl.
  CPC ...... *G06F 12/0893* (2013.01); *G06F 12/1408* (2013.01); *G06F 2212/1044* (2013.01); *G06F 2212/222* (2013.01)

(58) Field of Classification Search
  CPC .............. G06F 12/0891–12/0897; G06F 12/10–12/109; G06F 17/00; G06F 17/30–17/30997; G06F 2201/00–2201/885; G06F 2211/00–2211/902; G06F 2212/00–2212/7211; G06F 2216/00–2216/17
  See application file for complete search history.

(56) References Cited

U.S. PATENT DOCUMENTS

| | | | |
|---|---|---|---|
| 5,333,318 A | 7/1994 | Wolf | |
| 5,590,320 A | 12/1996 | Maxey | |
| 5,630,093 A | 5/1997 | Holzhammer | |
| 5,644,701 A | 7/1997 | Takewaki | |
| 5,682,497 A | 10/1997 | Robinson | |
| 5,684,976 A | 11/1997 | Soheili-Arasi | |
| 5,740,349 A | 4/1998 | Hasbun | |
| 5,761,501 A | 6/1998 | Lubbers | |
| 5,838,614 A | 11/1998 | Estakhri | |
| 5,907,856 A | 5/1999 | Estakhri | |
| 5,909,694 A | 6/1999 | Gregor | |
| 5,913,226 A | 6/1999 | Sato | |
| 5,966,726 A | 10/1999 | Sokolov | |
| 6,046,936 A | 4/2000 | Tsujikawa | |
| 6,049,672 A | 4/2000 | Shiell | |
| 6,119,209 A * | 9/2000 | Bauman | G06F 12/0895 711/118 |
| 6,128,623 A * | 10/2000 | Mattis | G06F 17/30902 707/695 |
| 6,192,450 B1 * | 2/2001 | Bauman | G06F 12/0804 711/133 |
| 6,216,199 B1 * | 4/2001 | DeKoning | G06F 12/0864 711/118 |
| 6,272,593 B1 | 8/2001 | Dujari | |
| 6,360,293 B1 | 3/2002 | Unno | |
| 6,510,083 B1 | 1/2003 | See | |
| 6,594,723 B1 | 7/2003 | Chapman | |
| 6,636,950 B1 | 10/2003 | Mithal | |
| 6,807,615 B1 | 10/2004 | Wong | |
| 6,851,015 B2 | 2/2005 | Akahane | |
| 6,901,499 B2 | 5/2005 | Aasheim | |
| 6,965,970 B2 | 11/2005 | Mosur | |
| 6,978,342 B1 | 12/2005 | Estakhri | |
| 7,290,109 B2 | 10/2007 | Horii | |
| 7,433,245 B2 | 10/2008 | Otsuka | |
| 7,472,205 B2 | 12/2008 | Abe | |
| 7,533,214 B2 | 5/2009 | Aasheim | |
| 7,640,262 B1 * | 12/2009 | Beaverson | G06F 17/30327 |
| 7,673,099 B1 | 3/2010 | Beaverson | |
| 7,702,628 B1 | 4/2010 | Luchangco | |
| 7,711,923 B2 * | 5/2010 | Rogers | G06F 12/0292 711/103 |
| 7,720,892 B1 | 5/2010 | Healey, Jr. | |
| 7,930,559 B1 | 4/2011 | Beaverson | |
| 7,996,605 B2 | 8/2011 | Koga | |
| 8,300,465 B2 | 10/2012 | Jeon | |
| 8,533,395 B2 | 9/2013 | O'Connor | |
| 8,583,854 B2 | 11/2013 | Ji | |
| 8,606,604 B1 | 12/2013 | Huber | |
| 8,634,248 B1 | 1/2014 | Sprouse | |
| 8,688,650 B2 | 4/2014 | Mutalik | |
| 8,688,913 B2 | 4/2014 | Benhase | |
| 8,738,841 B2 | 5/2014 | Olbrich | |
| 8,738,857 B1 | 5/2014 | Clark | |
| 8,793,543 B2 | 7/2014 | Tai | |
| 8,811,074 B2 | 8/2014 | Goss | |
| 8,817,541 B2 | 8/2014 | Li | |
| 8,904,117 B1 | 12/2014 | Kalekar | |
| 8,910,020 B2 | 12/2014 | Frayer | |
| 8,917,559 B2 | 12/2014 | Bisen | |
| 8,935,446 B1 * | 1/2015 | Shilane | G06F 12/0871 710/62 |
| 8,943,282 B1 | 1/2015 | Armangau | |
| 9,026,737 B1 | 5/2015 | Armangau | |
| 9,043,517 B1 | 5/2015 | Sprouse | |
| 9,098,420 B2 | 8/2015 | Bulut | |
| 9,116,793 B2 | 8/2015 | Kandiraju | |
| 9,135,123 B1 | 9/2015 | Armangau | |
| 9,152,496 B2 | 10/2015 | Kanade | |
| 9,171,629 B1 | 10/2015 | Kokubun | |
| 9,189,402 B1 | 11/2015 | Smaldone | |
| 9,189,414 B1 * | 11/2015 | Shim | G06F 12/08 |
| 9,213,642 B2 | 12/2015 | Chiu | |
| 9,274,954 B1 | 3/2016 | Bairavasundaram | |
| 9,281,063 B2 | 3/2016 | Xiang | |
| 9,313,271 B2 | 4/2016 | Venkat | |
| 9,317,218 B1 | 4/2016 | Botelho | |
| 9,436,403 B1 | 9/2016 | Zhang | |
| 9,442,662 B2 | 9/2016 | Dancho | |
| 9,442,670 B2 | 9/2016 | Kruger | |
| 9,524,235 B1 | 12/2016 | Sprouse | |
| 9,535,856 B2 | 1/2017 | Coronado | |
| 9,690,713 B1 | 6/2017 | Khermosh | |
| 9,697,267 B2 | 7/2017 | Kadayam | |
| 9,703,816 B2 | 7/2017 | George | |
| 9,753,660 B2 | 9/2017 | Mani | |
| 9,811,276 B1 | 11/2017 | Taylor | |
| 9,870,830 B1 | 1/2018 | Jeon | |
| 9,952,769 B2 | 4/2018 | Badam | |
| 9,959,058 B1 | 5/2018 | O'Brien | |
| 10,002,073 B2 | 6/2018 | Cai | |
| 10,037,164 B1 | 7/2018 | Wallace et al. | |
| 10,055,150 B1 | 8/2018 | Fenol | |
| 10,055,351 B1 * | 8/2018 | Wallace | G06F 12/0864 |
| 10,089,025 B1 | 10/2018 | Wallace et al. | |
| 10,146,438 B1 | 12/2018 | Shilane et al. | |
| 2001/0029564 A1 | 10/2001 | Estakhri | |
| 2003/0009623 A1 | 1/2003 | Arimilli | |
| 2003/0009637 A1 | 1/2003 | Arimilli | |
| 2003/0009639 A1 | 1/2003 | Arimilli | |
| 2003/0009641 A1 | 1/2003 | Arimilli | |
| 2003/0009643 A1 | 1/2003 | Arimilli | |
| 2003/0217227 A1 | 11/2003 | Parthasarathy | |
| 2004/0123270 A1 | 6/2004 | Zhuang | |
| 2005/0120180 A1 | 6/2005 | Schornbach | |
| 2005/0165828 A1 * | 7/2005 | Lango | G06F 12/0866 |
| 2006/0015768 A1 | 1/2006 | Valine | |
| 2006/0059171 A1 | 3/2006 | Borthakur | |
| 2006/0101200 A1 | 5/2006 | Doi | |
| 2006/0143390 A1 | 6/2006 | Kottapalli | |
| 2006/0179174 A1 | 8/2006 | Bockhaus | |
| 2006/0184744 A1 | 8/2006 | Langston | |
| 2007/0005928 A1 | 1/2007 | Trika | |
| 2007/0061504 A1 | 3/2007 | Lee | |
| 2007/0156842 A1 | 7/2007 | Vermeulen | |
| 2007/0180328 A1 | 8/2007 | Cornwell | |
| 2007/0300037 A1 | 12/2007 | Rogers | |
| 2008/0046655 A1 | 2/2008 | Bhanoo | |
| 2008/0065809 A1 * | 3/2008 | Eichenberger | G06F 12/0864 711/3 |
| 2008/0077782 A1 | 3/2008 | Lataille | |
| 2008/0120469 A1 | 5/2008 | Kornegay | |
| 2008/0147714 A1 | 6/2008 | Breternitz | |
| 2008/0177700 A1 | 7/2008 | Li | |
| 2008/0183955 A1 | 7/2008 | Yang | |
| 2008/0263114 A1 | 10/2008 | Nath | |
| 2008/0266962 A1 | 10/2008 | Jeon | |
| 2008/0273400 A1 | 11/2008 | La Rosa | |
| 2008/0313132 A1 | 12/2008 | Hao | |
| 2009/0063508 A1 * | 3/2009 | Yamato | G06F 17/30091 |
| 2009/0216788 A1 | 8/2009 | Rao | |
| 2009/0222626 A1 | 9/2009 | Ingle | |

(56) References Cited

U.S. PATENT DOCUMENTS

| | | |
|---|---|---|
| 2009/0240871 A1 | 9/2009 | Yano |
| 2009/0300265 A1 | 12/2009 | Vyssotski |
| 2010/0023697 A1 | 1/2010 | Kapoor |
| 2010/0070715 A1 | 3/2010 | Waltermann |
| 2010/0082886 A1 | 4/2010 | Kwon |
| 2010/0115182 A1 | 5/2010 | Murugesan |
| 2010/0165715 A1 | 7/2010 | Donze |
| 2010/0185807 A1 | 7/2010 | Meng |
| 2010/0199027 A1 | 8/2010 | Pucheral |
| 2010/0211744 A1 | 8/2010 | Morrow |
| 2010/0229005 A1 | 9/2010 | Herman |
| 2010/0306448 A1 | 12/2010 | Chen |
| 2010/0332952 A1 | 12/2010 | Chung |
| 2011/0010698 A1 | 1/2011 | Byom |
| 2011/0022778 A1 | 1/2011 | Schibilla |
| 2011/0072217 A1 | 3/2011 | Hoang |
| 2011/0138105 A1 | 6/2011 | Franceschini |
| 2011/0138132 A1 | 6/2011 | Brueggen |
| 2011/0153953 A1 | 6/2011 | Khemani |
| 2011/0225141 A1 | 9/2011 | Chaudhry |
| 2011/0264865 A1 | 10/2011 | Mobarak |
| 2011/0276780 A1* | 11/2011 | Sengupta ............ G06F 12/0862 711/216 |
| 2011/0276781 A1* | 11/2011 | Sengupta ............ G06F 12/0862 711/216 |
| 2011/0296110 A1* | 12/2011 | Lilly ................... G06F 13/1668 711/118 |
| 2012/0054414 A1 | 3/2012 | Tsai |
| 2012/0084484 A1 | 4/2012 | Post |
| 2012/0102268 A1 | 4/2012 | Smith |
| 2012/0110247 A1* | 5/2012 | Eleftheriou ......... G06F 12/0246 711/103 |
| 2012/0215970 A1 | 8/2012 | Shats |
| 2012/0275466 A1 | 11/2012 | Bhadra |
| 2013/0036418 A1 | 2/2013 | Yadappanavar |
| 2013/0103911 A1 | 4/2013 | Bulut |
| 2013/0205089 A1 | 8/2013 | Soerensen |
| 2013/0282964 A1* | 10/2013 | Sengupta ............ G06F 12/0866 711/103 |
| 2013/0325817 A1 | 12/2013 | Whitehouse |
| 2013/0339576 A1 | 12/2013 | Liu |
| 2014/0013027 A1 | 1/2014 | Jannyavula Venkata |
| 2014/0098619 A1 | 4/2014 | Nazarian |
| 2014/0122818 A1 | 5/2014 | Hayasaka |
| 2014/0136762 A1 | 5/2014 | Li |
| 2014/0143505 A1 | 5/2014 | Sim |
| 2014/0149401 A1* | 5/2014 | Liu ................... G06F 17/30864 707/723 |
| 2014/0173330 A1 | 6/2014 | Samanta |
| 2014/0215129 A1 | 7/2014 | Kuzmin |
| 2014/0281167 A1 | 9/2014 | Danilak |
| 2014/0281824 A1 | 9/2014 | Oh |
| 2015/0127889 A1 | 5/2015 | Hwang |
| 2015/0205722 A1 | 7/2015 | Chiu |
| 2015/0277786 A1 | 10/2015 | Rostock |
| 2015/0331807 A1 | 11/2015 | Lie |
| 2015/0347291 A1 | 12/2015 | Choi |
| 2015/0363285 A1 | 12/2015 | Delaney |
| 2016/0041927 A1 | 2/2016 | Jung |
| 2016/0147669 A1 | 5/2016 | Huang |
| 2016/0274819 A1 | 9/2016 | Choi |
| 2017/0060439 A1 | 3/2017 | Harawasa |
| 2017/0091054 A1 | 3/2017 | Delaney |

OTHER PUBLICATIONS

RwHash: Rewritable Hash Table for Fast Network Processing with Dynamic Membership Updates; Song et al.; ACM/IEEE Symposium on Architectures for Networking and Communications Systems; May 18-19, 2017 (Year: 2017).*

U.S. Appl. No. 15/196,150, filed Jun. 29, 2016, Shilane, et al.
U.S. Appl. No. 15/196,261, filed Jun. 29, 2016, Shilane, et al.
U.S. Appl. No. 15/196,283, filed Jun. 29, 2016, Shilane, et al.
U.S. Appl. No. 16/049,891, filed Jul. 31, 2018, Wallace, et al.
U.S. Appl. No. 16/146,584, filed Sep. 28, 2018, Wallace, et al.
CAFTL: A Content-Aware Flash Translation Layer Enhancing the Lifespan of Flash Memory based Solid State Drives; Chen et al; Proceedings of the 9th USENIX conference on File and storage technologies; Feb. 15-17, 2011; retrieved from Proceedings of the 9th USENIX conference on File and storage technologies on Jul. 15, 2017 (14 pages).
A Forest-structured Bloom Filter with flash memory; Lu et al; IEEE 27th Symposium on Mass Storage Systems and Technologies; May 23-27, 2011 (6 pages).
Algorithms in Java, Third Edition; Sedgewick, Robert; ISBN 0-201-36120-5; 2003; pp. 91-94 (4 pages) (9 total includes clean text).
Skip lists: a probabilistic alternative to balanced trees; Pugh, William; Communications of the ACM, vol. 33, iss. 6; 6/19990; pp. 668-676 (9 pages).
NAND Flash Memory: Challenges and Opportunities; Li et al; IEEE Computer, vol. 46, iss. 8; Aug. 2013; pp. 23-29 (Year: 2013).
Dysource: a high performance and scalable NAND flash controller architecture based on source synchronous interface; Wu et al; Proceedings of the 12th ACM International Conference on Computing Frontiers, Article No. 25; May 18-21, 2015 (Year: 2015).
Hardware/software architecture for flash memory storage systems; Min et al; Proceedings of the 14th international conference on Compilers, architectures and synthesis for embedded systems; Oct. 9-14, 2011; pp. 235-236 (Year: 2011).
A self-adjusting flash translation layer for resource-limited embedded systems; Wu, Chin-Hsien; ACM Transactions on Embedded Computing Systems, vol. 9, iss. 4, Article No. 31; Mar. 2010 (Year: 2010).
DHash: A cache-friendly TCP lookup algorithm for fast network processing; Zhang et al; 38th Conference on Local Computer Networks; Oct. 21-24, 2013; pp. 484-491 (8 pages) (Year: 2013).
A comparison of adaptive radix trees and hash tables; Alvarez et al; 31st International Conference on Data Engineering; Apr. 13-17, 2015; pp. 1227-1238 (12 pages) (Year: 2015).
A Workload-Aware Adaptive Hybrid Flash Translation Layer with an Efficient Caching Strategy; Park et al; 19th International Symposium on Modeling, Analysis & Simulation of Computer and Telecommunication Systems; Jul. 25-27, 2011; pp. 248-255 (8 pages) (Year: 2011).
B-tree indexes and CPU caches; Graefe et al; 17th International Conference on Data Engineering; Apr. 2-6, 2001; pp. 349-358 (10 pages) (Year: 2001).
History-aware page replacement algorithm for NAND flash-based consumer electronics; Lin etal.; IEEE Transactions on Consumer Electronics, vol. 62, iss. 1; Feb. 2016; pp. 23-39 (Year: 2016).
A novel hot data identification mechanism for NAND flash memory; Liu et al.; IEEE Transactions on Consumer Electronics, vol. 61, iss. 4; Nov. 2015; pp. 463-469 (Year: 2015).
Hot data identification for flash-based storage systems using multiple bloom filters; Park et al.; 27th Symposium on Mass Storage Systems and Technologies; May 23-27, 2011 (Year: 2011).
BloomFlash: Bloom Filter on Flash-Based Storage; Debnath et al.; 2011 31st International Conference on Distributed Computing Systems; Jun. 20-24, 2011; pp. 635-644 (Year: 2011).
Software Support Inside and Outside Solid-State Devices for High Performance and High Efficiency; Chen etal.; Proceedings of the IEEE, vol. 105, iss. 3; Sep. 2017; pp. 1650-1665 (Year: 2017).
A performance model and file system space allocation scheme for SSDs; Hyun etal.; IEEE 26th Symposium on Mass Storage Systems and Technologies; May 3-7, 2010 (Year: 2010).
Algorithms and data structures for flash memories; Gal et al.; ACM Computing Surveys, vol. 37, iss. 2, pp. 138-163; Jun. 2005 (Year: 2005).
Design and implementation of NAND Flash files system based on the double linked list; Wang et al.; 2011 International Conference on Electrical and Control Engineering; Sep. 16-18, 2011 (Year: 2011).
Hydra: A Block-Mapped Parallel Flash Memory Solid-State Disk Architecture; Seong etal.; IEEE Transactions on Computers, vol. 59, iss. 7, pp. 905-921; Jul. 2010 (Year: 2010).

(56) References Cited

OTHER PUBLICATIONS

A DRAM-flash index for native flash file systems; Ho et al.; 2013 International Conference on Hardware/Software Codesign and System Synthesis, pp. 1-10; Sep. 29, 2013-Oct. 4, 2013.
A sequential indexing scheme for flash-based embedded systems; Yin et al.; Proceedings of the 12th International Conference on Extending Database Technology: Advances in Database Technology, pp. 588-599; Mar. 24-26, 2009.
U.S. Appl. No. 16/209,054, filed Dec. 4, 2018, Shilane, et al.
FlashStore: high throughput persistent key-value store; Debnath et al.; Proceedings of the VLDB Endowment, vol. 3, iss. 1-2, pp. 1414-1425; Sep. 2010.
SkimpyStash: RAM space skimpy key-value store on flash-based storage; Debnath et al.; Proceedings of the 2011 ACM SIGMOD International Conference on Management of data, pp. 25-36; Jun. 12-16, 2011.
A multi-level elaborate least frequently/recently used buffer cache for flash storage systems; Noh et al.; Proceedings of the 2009 International Conference on Hybrid Information Technology, pp. 34-41; Aug. 27-29, 2009.
Implementing personal home controllers on smartphones for service-oriented home network; Tokuda et al.; IEEE 8th International Conference on Wireless and Mobile Computing, Networking and Communications, pp. 769-776; Oct. 8-10, 2012 (Year: 2012).

* cited by examiner

LOW-OVERHEAD INDEX FOR A FLASH CACHE

CROSS-REFERENCE TO RELATED APPLICATIONS

The present application is a Continuation of U.S. patent application Ser. No. 15/196,163 filed Jun. 29, 2016 and scheduled to issue as U.S. Pat. No. 10,055,351 on Aug. 21, 2018, which application is incorporated by reference herein.

FIELD OF THE INVENTION

Embodiments of the invention relate to systems and methods for managing memory in a computing environment. More particularly, embodiments of the invention relate to systems and methods for implementing an index for a memory device such as a flash cache.

BACKGROUND

In order to improve the performance of computing systems, caches are often implemented. A computing system can involve a single cache or tiered cache levels. Further, the cache can be large. For example, a computing system may use a flash cache to cache data. An index may be used to track the data stored in the flash cache. The index may associate a location of the data with an identifier of the data. When data is accessed (e.g., read or written), the index is consulted using a lookup operation. Because a flash cache can be large, the index may also be large. Unfortunately, maintaining a large index consumes a significant portion of memory. Systems and methods are needed to implement a low-overhead index for a cache such as a flash cache.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
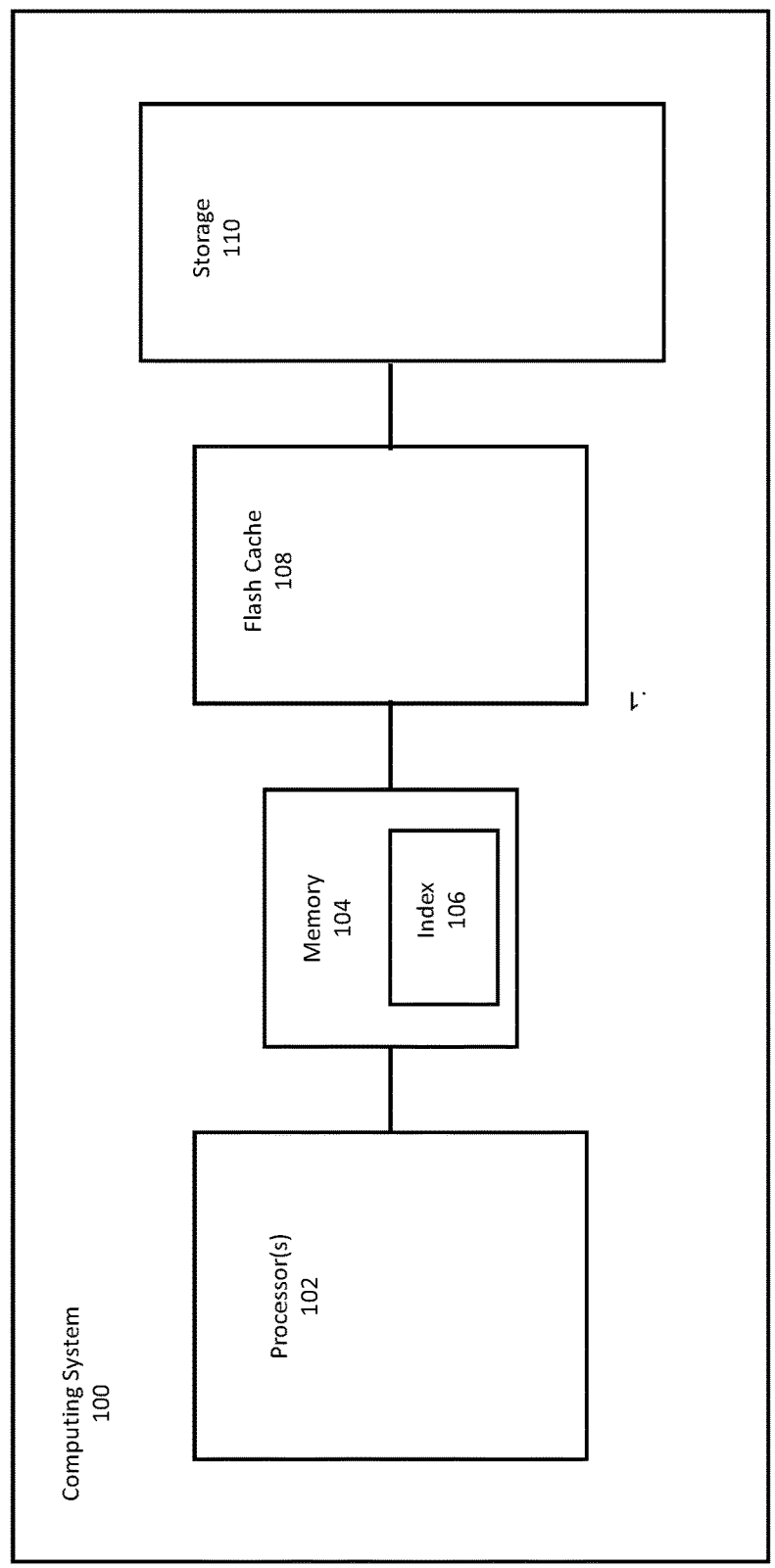
FIG. 1 illustrates an example of a computing environment that includes an index used to access content stored in a cache.

Embodiments of the invention relate to cache indexing and more specifically to cache indexing using an index that includes shortened or partial identifiers (for example using the first 4 bytes of a 20 byte SHA-1 hash). By way of example, a SHA-1 hash is an example of an identifier and a portion of the hash (short hash) is an example of a short identifier. Keys, cryptographic hashes, fingerprints, and the likes are examples of identifiers and short identifiers can be obtained therefrom. In addition to the partial or short identifiers, the index may include additional information, such as segment size or segment type. The additional information can be used to increase the probability that a matched partial identifier in the index corresponds with the data segment that has actually been requested. The additional information can also ensure that the most likely data segment is identified when more than one partial identifier matches the corresponding part of the identifier of a requested data segment. In addition, an asymmetric cache response time is provided and cache misses are very fast. Further, a cache hit or match is identified as probable based on the short identifier, and the cache hit is then confirmed by reading the segment and validating that the correct identifier is stored with the segment.

Embodiments of the invention may be implemented in de-duplicated storage systems and other storage systems. An identifier such as a hash (e.g., SHA-1) can be used to uniquely identify the content of a data segment. These hashes are examples of identifiers that are used to identify segments or data segments. Identifiers can be stored in an index (e.g., a hash table) and when a new data segment arrives to be included in the storage system, the identifier is calculated and looked up in the hash table. If a previous entry exists in the hash table, indicating that the data segment is in the storage system, then the new segment does not need to be stored in the storage system because it has been identified as a duplicate of a previous data segment. The index is also consulted to read back data associated with an identifier.

In order to have a very high probability that identifiers are unique, such that only the exact same data segment would produce the same identifier, the identifiers need to be rather large in size (by way of example on the order of 20 bytes). But large identifiers have a drawback in terms of the memory or storage required to store them.

When indexing a flash cache (or other storage), the index to the data segments stored in the cache may be stored in a faster memory for performance reasons. However, large identifier sizes limit how many data segments can be referenced in the memory. Embodiments of the invention relate to an index that includes only a portion of the identifier (a short identifier). Using a short identifier allows more data segments to be referenced using less memory. However, short identifiers may result in collisions when using the index. A collision occurs, by way of example, when more than one distinct data segments have the same short identifier and are thus incorrectly determined to be a match. Collisions are acceptable as long as they can be detected and handled.

The index may include other information or metadata. The metadata may include, by way of example, a data segment location in the flash cache, segment size, segment type, path, or the like or combination thereof) in order to resolve the collisions. This information allows a collision to be disambiguated. For example, a read request typically knows the size of the segment to be read. In a system where segment sizes are different (e.g., based on content defined patterns used to anchor the segment boundaries), the size of the data segment in combination with the short identifier can disambiguate a collision. When writing data to a flash cache, the short-identifier and size (or other characteristic) can be used in combination to determine if the data segment being written is already in the cache. Even though there is still a possibility of a collision when using the short identifier in combination with other information, the possibility of collision is smaller. As another example, a storage system may use a long string to identify a file with its path, and a partial identifier would be a hash of the string shortened to a specified number of bytes. The short hash may collide, while the long string is unique. A secondary metadata may be stored in the index such as the file size or owner's ID number, which can be used to reduce the chance of collisions.

When performing a write to the cache, it is not imperative to insert the data segment into the cache. If an insertion operation cannot be disambiguated at the index, it is not necessary to perform the insertion. Alternatively, a data segment can be inserted as a new data segment and the previous entry can be marked for deletion.

Generally, the index is used during various operations such as read and write operations. In one example, a client may issue a lookup request using an identifier such as a fingerprint, key, or the like. The index is checked using a portion of the identifier and using at least one secondary metadata. If a combination of the short identifier and the other secondary metadata is not present in the index, a miss is reported (report false) and returned to the client. If the combination of the short identifier and other secondary metadata exists in the index, an asynchronous read of the data from the cache may be issued and a provisional true result is returned to the client. Thus, true may be provisionally reported even if the data segment has not been read from the cache. This response indicates that there will be a call back from the asynchronous read and that the result of the read may be either true or false. A return of true from the asynchronous read would indicate the data is cached and being returned. A return of false from the asynchronous read would indicate that upon reading the data it was determined to be a collision case where the combination of short identifier and other secondary metadata also match a different data segment.

When the cache returns with the data segment and the full identifier, the full identifier can be compared with the identifier included in the initial request to determine whether the identifier returned from the cache matches the identifier included in the lookup. If the match is false, a false report is returned to the client and if the match is true, a true report is reported to the client along with the requested data.

By sizing the short identifier appropriately, a short identifier match indicates, with high probability, that the data segment is located in the cache. Embodiments of the invention can identify a miss quickly and with certainty when the short identifier is not found in the index. Embodiments of the invention are described in the context of a cache such as a flash cache and an index stored in memory. However, one of skill in the art can appreciate that embodiments of the invention may be applied to other storage configurations. The data segments, for example, may be stored in hard disk drives, which are much slower than a flash cache. The data segments may also be stored in the cloud or other remote storage. Embodiments of the invention can reduce the number of times needed to access the flash cache or other storage device. When a cost is incurred for each access, embodiments of the invention can reduce costs.

FIG. 1 illustrates an example of a computing system 100. The computing system 100 may be implemented as an integrated device or may include multiple devices that are connected together using a network. The computing system 100 may be configured to perform a special purpose. For example, the computing system 100 may be configured to perform data protection operations. Example data protection operations include, but are not limited to, backing up data from one or more clients, restoring data to one or more clients, implementing a low-overhead index, de-duplicating data backed up in the computing system, indexing data stored in the computing system, optimizing the data stored in the computing system, reading a cache, writing to a cache, or the like or combination thereof.

The computing system 100 may include a processor 102 (or multiple processors), a memory 104, a flash cache 108 (or other suitable memory type), and storage 110. The memory 104 and the flash cache 108 may both be configured as a cache. The memory 104, for example, may be DRAM or the like. The memory 104 is typically faster and smaller than the flash cache 108. The flash cache 108 is typically smaller and faster than the storage 110.

The memory 104, flash cache 108, and storage 110 are arranged to improve performance of the computing system 100. Over time, by way of example, data that is requested more frequently tends to reside in the flash cache 108.

An index 106 is maintained in the memory 104. The index 106 includes multiple entries and each entry corresponds to data or a data segment stored in the flash cache 108. In one example, the index 106 may be implemented as a table such as a hash table. The hash in an entry of the index is an identifier of data corresponding to the entry. In one example, the index 106 may not store the complete identifier. The index 106 may include short identifiers of data stored in the flash cache 108. Each entry in the index 106 may also store other information or metadata such as a segment size and segment type of the data associated with the identifier, or the like or other combination thereof.

In one example, the entries in the index 106 only include partial identifiers. This allows the index 106 to reference more data in the flash cache 108 while using less of the memory 104. As previously indicated, partial or short identifiers are not necessarily unique and there is a risk of a collision. A collision, for example, occurs when more than one entry in the cache exists for a given request. More specifically, some of the partial identifiers in the index 106 may be the same. Embodiments of the invention augment the index with additional information such that collisions can be avoided and such that the requested data can be accurately identified and such that ambiguities or collisions in the index can be resolved.

In one embodiment, collisions in the index 106 can be resolved by establishing multiple points for comparison. In addition to comparing the partial or short identifier associated with the data, a comparison may also be performed using the other metadata stored in the index 106. Segment size, type, or the like can also be evaluated in the context of the request. By allowing multiple points of comparison, false positives can be reduced and the appropriate entry in the cache 108 can be identified if present.

When data in the computing system is requested, a request is generated for the cache. For example, a client may issue a read request or lookup using an identifier. The read request may include certain information about the requested data. The read request may include the identifier of the requested data, a segment size, a segment type, or the like or other combination thereof. The index 106 may be searched based on the identifier to determine if any of the partial identifiers in the index 106 are a match for the identifier of the requested data. If there is a match, at least one of the other metadata in the index may be compared with the information in the request. If a combination of the identifier and other metadata is not present in the index, the data does not exist in the cache and a false result is returned to the client. If the combination is present in the index, a read is issued and a provisional true result is returned to the client even if the read has not completed. When the cache returns the data and the full identifier, the full identifier is compared with the identifier included in the original request. A match is reported as true and a mismatch results in a false result.

When writing to the cache a lookup is performed in the index based on the partial or short identifier. The other metadata may also be compared. If a match does not exist in the index, then the data is inserted into the cache and the index is updated. If a match of the short identifier and secondary metadata is present, the write may be disregarded. Alternatively, the write (e.g., of a data segment) may be inserted into the cache, the index is updated to include an entry that points to the new data segment in the cache, and the previous entry is marked for deletion.

Figure 2:
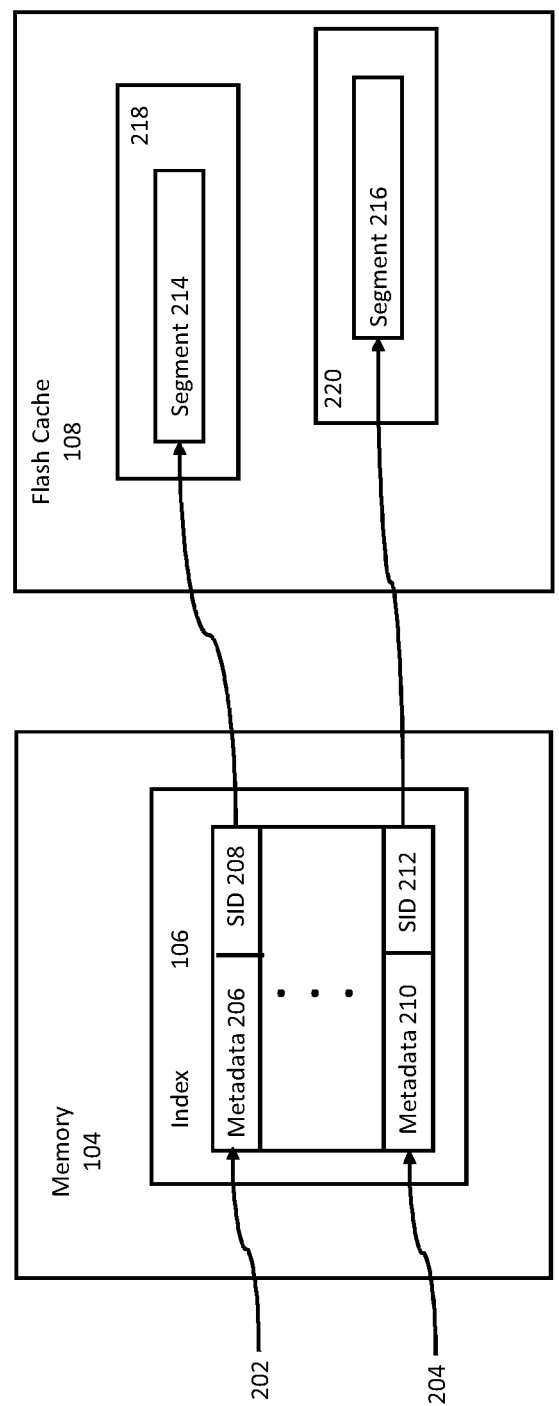
FIG. 2 illustrates an example of the index used to access the cache and illustrates that entries in the index include a short identifier and at least one other metadata or field.

FIG. 2 illustrates a relationship between an index in memory and a flash cache. FIG. 2 illustrates that the memory 104 includes the index 106. The index 106 includes multiple entries such as the entry 202 and the entry 204. Each of the entries is associated with a data segment in the flash cache 108. In this example, the entry 202 points to or identifies the location of the data segment 214, and the entry 204 points to or identifies the location of the data segment 216. The segment 214 may be included in a container 218 and the segment 216 may be included in a container 220. Each of the containers may store multiple data segments. The fingerprints of the segments may be stored in a container header.

More specifically, each entry in the index 106 includes at least one metadata 206 and a SID (short identifier) 208. In this example, the SID 208 includes part of the data segment's 214 full identifier. For example, if a normal or full identifier is 20 bytes, the partial identifier 208 includes fewer than 20 bytes. The partial identifier 208 may include the most significant bits, the least significant bits, or other combination of bits. By using a partial or short identifier in the index 106, the index 106 can store information for more segments in the flash cache 108. If the SID is 10 bytes, then a memory or allocated portion of the memory can store approximately twice as many references.

The metadata 206 and 210 may include one or more of a location of the segment, a size of the data segment, a type of the data segment, or other metadata about the segment 214.

Figure 3:
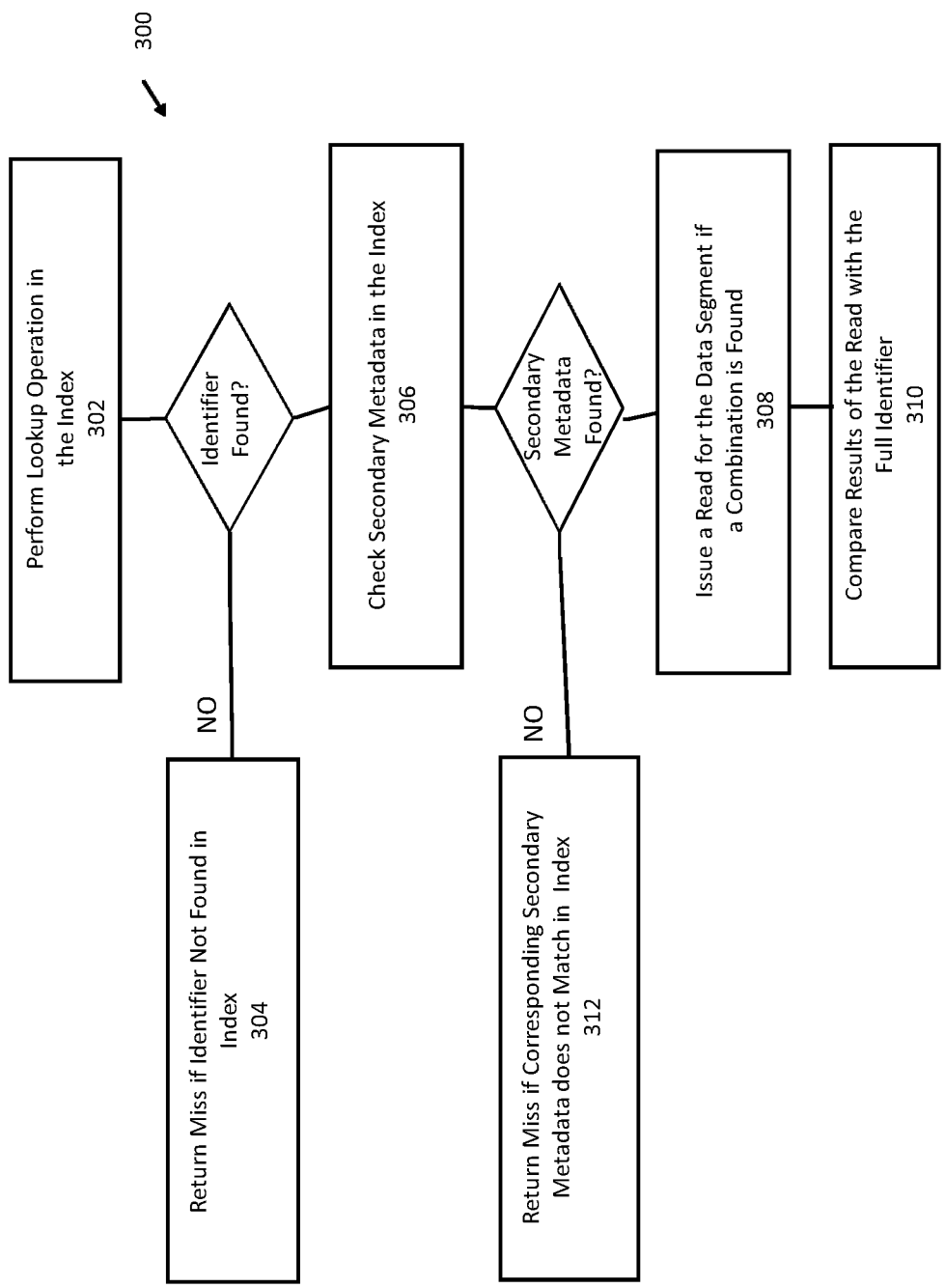
FIG. 3 illustrates an example of a method for accessing data stored in the cache using the index.

FIG. 3 is an example of a method for reading the flash cache using the index. The method 300 typically begins by performing a lookup operation in the index in box 302. The lookup operation may be performed in response to a request from a client of the computing system. The request that is the basis of the lookup operation may include an identifier of the data segment being requested, written, or accessed. The request may also include a segment type, a segment size, or other information related to the requested data segment. The portion of the identifier corresponding to the short identifiers stored in the index is used in the lookup operation.

If the short identifier is not found in the index, a miss can be returned immediately and the method may end after returning the miss. If the short identifier is not found, a miss is returned in box 304. If a hit is found, the secondary metadata may be evaluated or checked in box 306. If the lookup operation identifies a single match, it may be possible to issue a read request. However, the likelihood of reading the correct data segment from the cache can be improved by evaluating other metadata in the index. Further, the lookup operation may identify more than one match in the index. In other words, more than one short identifier may match the portion of the identifier used to search or access the index.

In box 306, whether a single match is identified or whether multiple matches are identified, secondary metadata in the index may also be compared with information included in the request if necessary. By evaluating the secondary metadata, the number of matches can be reduced, thus reducing collisions, and the likelihood of requesting the correct data segment from the cache is improved. When the short identifier and at least one of the other metadata match with the information included in the lookup request, a combination is found in box 308 and a read request is issued to the flash cache. A provisional true result may be returned to the client even if the data has not been read from the flash cache. When the secondary metadata does not match, a miss is returned in box 312.

When a combination is found in box 308, the flash cache is read and the flash cache returns the data segment in response to the read request. The flash cache may also return information associated with the data segment such as the full identifier. In box 310, the identifier returned from the flash cache in response to the read request is compared with the identifier in the original lookup request. If these identifiers match, then a hit is achieved and the data segment is returned. If these identifiers do not match, then a miss is returned to the client. If the data segment is not present in the flash cache, it may be retrieved from storage 110 for example.

Figure 4:
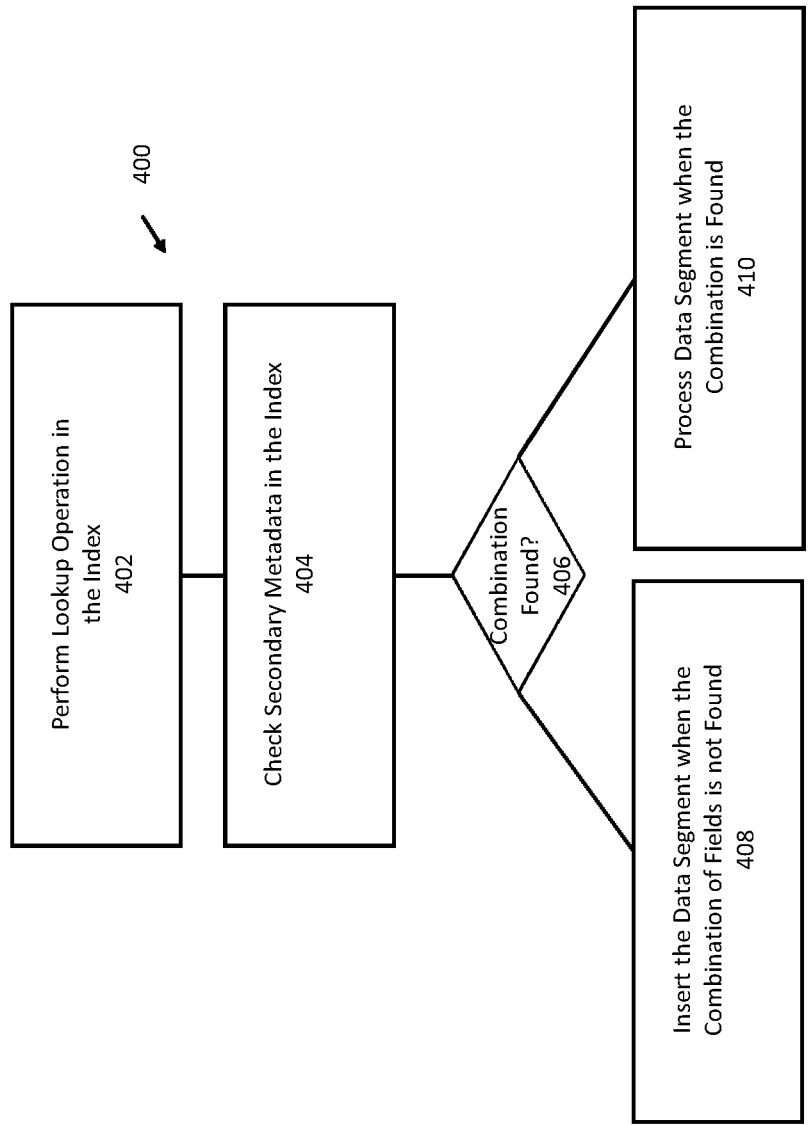
FIG. 4 illustrates an example of a method for writing data to the cache using the index.

FIG. 4 illustrates an example of a method for writing to a flash cache. The method 400 initially performs a lookup operation in the index in box 402. The lookup operation may be performed in response to a write request from a client. The write request may include an identifier of the data being written, a segment type, a segment size, or the like. The lookup operation is performed by identifying any short identifiers in the index that match a corresponding portion of the identifier included in the write request.

In box 404, the lookup operation may check the secondary metadata in the index associated with matching short identifiers. By checking the secondary metadata, the most correct entry in the index can be identified. If a combination is found (i.e., when the short identifier and at least one of the secondary metadata in the index match those in the request from the client) in box 406, the data segment is processed in 410.

Processing the data segment when a combination is found can include disregarding the current data segment and leaving the existing data segment in the cache. Alternatively, the data segment can be inserted into the cache and the previous segment already in the cache can be marked for deletion. This option may be performed if the locality for the new entry in the cache is preferred. For example, the locality can be improved in terms of erasures performed in the flash cache or in terms of future sequential reads on the storage (e.g., a hard disk drive). If the combination is not found in box 406, the data may be inserted into the cache in box 408.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon.

Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for inserting data segments into a cache, the method comprising:
    determining a short identifier for a data segment in preparation for inserting the data segment into the cache, the data segment associated with a metadata;
    performing a lookup operation for the data segment in an index using the short identifier, wherein the index includes entries, each entry including at least a combination of a short identifier and a corresponding metadata, wherein each short identifier in the index is a portion of a corresponding identifier;
    determining whether a combination is present in the index for the data segment when the short identifier is present in the index by comparing the metadata of the data segment with entries in the index that include a short identifier that matches the short identifier associated with the data segment;
    inserting the data segment into the cache when the short identifier or the combination is not present in the index; and
    processing the data segment when the combination is found in the index.

2. The method of claim 1, wherein processing the data segment includes disregarding the data segment and leaving an existing data segment in the cache.

3. The method of claim 2, wherein processing the data segment includes improving locality in the cache by inserting the data segment into the cache and marking the previous data segment in the cache for deletion.

4. The method of claim 1, further comprising, after determining that the combination is present in the index, comparing a full identifier of the data segment with a full identifier associated with the combination in the index.

5. The method of claim 1, further comprising, when more than one combination is found in the index, identifying a most correct combination in the index.

6. The method of claim 5, further comprising identifying the most correct combination based on the metadata and the short identifier or based on a full identifier.

7. A method for inserting data segments into a cache, the method comprising:
    performing a lookup operation in an index using a short identifier of a data segment to determine whether the data segment is present in the cache, wherein the data segment is associated with a metadata, wherein the index includes entries, each entry including at least a combination of a short identifier and a corresponding metadata, wherein each short identifier in the index is a portion of a corresponding identifier;
    when the short identifier is found in an entry in the index, comparing a metadata included in the entry with the metadata associated with the data segment;
    returning a miss when the metadata in the entry does not match the metadata associated with the data segment;
    inserting the data segment into the cache when the short identifier is not found in the index or when receiving the miss;
    determining that a combination for the data segment is present in the index when the short identifier associated with the data segment is present in the index and the metadata in an index entry associated with the matching short identifier of the data segment matches the metadata associated with the data segment; verifying that the combination identifies the data segment and inserting the data segment into the cache when the combination is not verified, wherein the data segment is not inserted into the cache when the combination is verified.

8. The method of claim 7, further comprising disregarding the data segment and leaving an existing data segment in the cache when the combination is verified.

9. The method of claim 8, further comprising improving locality in the cache by inserting the data segment into the cache and marking the previous data segment in the cache for deletion.

10. The method of claim 7, further comprising, after determining that the combination is present in the index, verifying the combination by comparing a full identifier of the data segment with a full identifier associated with the combination in the index.

11. The method of claim 7, further comprising, when more than one combination is found in the index, identifying a most correct combination in the index.

12. The method of claim 11, further comprising identifying the most correct combination based on comparing the metadata associated with the data segment with the metadata stored in the entries whose short identifiers match the short identifier of the data segment.

13. The method of claim 11, further comprising identifying a most correct combination based on a full identifier of the data segment.

14. A non-transitory computer readable medium comprising computer executable instructions that when executed perform a method for inserting data segments into a cache, the method comprising:

performing a lookup operation in an index using a short identifier of a data segment to determine whether the data segment is present in the cache, wherein the data segment is associated with a metadata, wherein the index includes entries, each entry including at least a combination of a short identifier and a corresponding metadata, wherein each short identifier in the index is a portion of a corresponding identifier;

when the short identifier is found in an entry in the index, comparing a metadata included in the entry with the metadata associated with the data segment;

returning a miss when the metadata in the entry does not match the metadata associated with the data segment;

inserting the data segment into the cache when the short identifier is not found in the index or when receiving the miss;

determining that a combination for the data segment is present in the index when the short identifier associated with the data segment is present in the index and the metadata in an index entry associated with the matching short identifier of the data segment matches the metadata associated with the data segment; verifying that the combination identifies the data segment and inserting the data segment into the cache when the combination is not verified, wherein the data segment is not inserted into the cache when the combination is verified.

15. The non-transitory computer readable medium of claim 14, further comprising disregarding the data segment and leaving an existing data segment in the cache when the combination is verified.

16. The non-transitory computer readable medium of claim 15, further comprising improving locality in the cache by inserting the data segment into the cache and marking the previous data segment in the cache for deletion.

17. The non-transitory computer readable medium of claim 14, further comprising, after determining that the combination is present in the index, verifying the combination by comparing a full identifier of the data segment with a full identifier associated with the combination in the index.

18. The non-transitory computer readable medium of claim 14, further comprising, when more than one combination is found in the index, identifying a most correct combination in the index.

19. The non-transitory computer readable medium of claim 18, further comprising identifying the most correct combination based on comparing the metadata associated with the data segment with the metadata stored in the entries whose short identifiers match the short identifier of the data segment.

20. The non-transitory computer readable medium of claim 18, further comprising identifying a most correct combination based on a full identifier of the data segment.

* * * * *